United States Patent Office
3,672,883
Patented June 27, 1972

3,672,883

CRYSTALLINE POLYMERS FOR FROST

Roger N. Ciccarelli and Burton B. Jacknow, Rochester, N.Y., assignors to Xerox Corporation, Rochester, N.Y.
No Drawing. Filed July 2, 1969, Ser. No. 838,672
Int. Cl. B41n *5/20;* G03g *13/22*
U.S. Cl. 96—1.1 18 Claims

ABSTRACT OF THE DISCLOSURE

A new class of materials useful in surface deformation imaging is provided comprising the utilization of sharp melting crystalline polymers.

BACKGROUND OF THE INVENTION

This invention relates to xerography and more particularly to novel electrostatic methods of forming visible patterns on surface deformable materials.

It is known that variations of charging a plastic film on a conductive substrate, followed by generally softening it, causes either of two types of surface deformation depending on the methods employed; the first method is known as relief imaging and the second method is known as frost imaging. In frost imaging solid area coverage of the images is provided, whereas in relief imaging only line copy image reproduction may be achieved. In relief imaging charges placed and held on the surface of an insulating film layer on a conductive support experience a force of attraction toward the charges of opposite polarity induced in the conductive substrate. When charge is dissipated or added or when a combination of both operations is performed on the insulating film in a non-uniform fashion by a suitable method sharp charge differences will be present on said film. These sharp charge differences result in an imbalance of force on the surface of the film causing it to deform if a cold flow material is used. Heat or a suitable solvent may be required for other materials to allow the deformation to take place. A photoconductive film can be made to translate exposure differences into charge differences thereby creating sharp differences in charge density between adjacent areas on the plastic insulating layer resulting in viscous flow at the boundaries. The response in this method is related to diferences in charge density of adjacent areas rather than absolute charge densities as in the frost imaging method so that relief imaging is not suited to continuous tone reproduction but results in only outline or line copy images.

In frost imaging, however, a form of surface deformation distinctly different from relief can be induced by charging a thin insulating film resulting in a diffusely reflecting or light scattering surface, the charged surface taking on a frosted appearance. The frost process is discussed in detail in a publication entitled "A Cyclic Xerographic Method Based on Frost Deformation" by R. W. Gundlach and C. J. Claus, Journal of Photographic Science and Engineering, February edition, 1963. The relief imaging process has been described in U.S. Pats. 3,055,006, 3,063,872 and 3,113,179.

As mentioned above the frost method may involve the electrophotographic process whereby a latent electrostatic image is produced on a thin dielectric thermoplastic film. This film is then deformed either concurrently with or subsequent to charging by heating or exposure to an atmosphere of solvent vapors which produce a solid area of visible image. By employing the proper sequence of charging and exposure on a plastic overcoated layer, a charge pattern can be created which controls selected wrinkling or frosting of the deformable layer to form solid area images. After the image is made visible by frosting, it may then be frozen by allowing the frosted film to harden by various methods such as by removing the source of heat, solvent vapor or the like used to soften the deformable layer. If it is desired to reuse the same film, the image can be erased after use by simply restoring and maintaining a low viscosity for a sufficient period of time using the very same methods employed to initially soften the film.

While many materials which are normally solid and electrically insulating and are capable of being temporarily softened by the application of heat, solvent vapors or the like may deform to form relief images by the relief imaging method described above, it is known that these same materials in many instances will not form frost images. In some cases it may be desirable to only have edge or outline imaging as is obtained by relief, however, in many instances it is more desirable to have images of solid area coverage as is obtainable by the frost method. Furthermore, it has also been noted that some thicker surface deformable electrically insulating materials, although being both reliefable and frostable, form comparably poor frost and relief images under the circumstances. In addition, those materials found to be suitable only for forming relief images have also, in a number of cases, been found to produce poor results. Certain requirements are imposed on those materials that may be utilized in the deformation process. These include but are not limited to the dielectric strength of the insulating film, conductivity, charge retention, maximum film thickness, viscosity, the ratio of charge retention to viscosity and the proper smoothness of the film surface of the material. Because of these considerations, the selection of compositions for use in either or both frost and relief is rather restricted. Certain thermoplastic materials, for example, that may have the desirable physical properties for commercial relief processes have been found unsuitable for the frost procedure. In addition, many compositions, although apparently possessing all the desirable physical and electrical properties necessary for commercial utility as deformable recording media, have demonstrated that the resulting frost or relief images in a number of instances are poorer in quality, and considerably less suitable than others for commercial application. Thus, by necessity the choice of surface deformable materials for either process above disclosed have thus been limited to a comparatively small number.

While the deformation of various thermoplastic insulating materials to produce images has been demonstrated to have procedurable limitations, problems are also encountered when it is desirable to fix or otherwise produce relatively permanent images on the particular deformable material. This problem exists generally because materials having relatively high quality image forming properties, correspondingly easily erase, thereby making formation of substantially permanent images relatively difficult to obtain.

SUMMARY OF THE INVENTION

It is, therefore, an object of this invention to provide a surface deformable imaging system which will overcome the above noted disadvantages.

Another object of this invention is to increase the selection of materials easily adapted for use as surface deformable recording media.

Yet another object of this invention is to provide a novel surface deformable imaging composition.

Yet another object of this invention is to provide a novel surface deformable composition adapted for use as an image deformable recording medium.

Again, still a further object of this invention is to provide a process which will permit the use of a substantially wider selection of relatively thin materials and films for frost processes.

A further object of this invention is to provide frostable materials having a wider range of varied physical and chemical properties.

It is a further object of this invention to provide a novel method of forming substantially permanent surface deformation images.

The foregoing objects and others are accomplished in accordance with the present invention, generally speaking, by providing a class of crystalline polymers suitable for use in surface deformation imaging. The term polymer when used in the course of the present invention is meant to embrace both homopolymers and copolymers. The materials utilized in accordance with the present invention are provided in the form of a film or layer of the nature described below having a thickness of about 1 micron or greater. An electrostatic charge pattern of about 25 volts or greater is formed on the surface of the film or layer. The imaged thermoplastic deforms in conformance with the electrostatic charge pattern. There is thus produced an imaged pattern consisting of raised and depressed portions corresponding to the electrostatic charge pattern. The image thus formed is fixed by any suitable technique such as by allowing the film or layer to cool. The resulting process produces frost images of high density and quality.

Any suitable crystalline polymer having a melting point of from about 30° C. to about 140° C., and an average molecular weight up to about 500,000 may be used. Generally materials within the class described having a melt viscosity measured at less than about $1\times10^6$ poises at the softening temperature may be used in accordance with the invention. Typical crystalline polymers include polyesters, polyamides, polyethers, polyurethane, polyolefins, isotactic acrylates, methacrylates; aromatic and side chain aromatics, side chain vinyl ethers, side chain fumarates and maleates, side chain vinyl ketones, side chain vinyl esters, side chain vinyl amides, side chain vinyl urethanes, side chain olefins and mixtures and copolymers thereof. Specifically preferred crystalline polymers for use in the concept of this invention are long side chain vinyl polymers such as acrylates and methacrylates and copolymers made up of styrene and side chain acrylate and methacrylate monomers. These crystalline polymers are preferred because they are particularly sharp melting, they possess good temperature stability characteristics and they have desirable frost properties. Of these, optimum results have been obtained with crystalline polymers prepared from monomers having the following formula:

$$\mathrm{C{=}\overset{\displaystyle R_1}{\overset{|}{C}}{-}\overset{\displaystyle O}{\overset{\|}{C}}{-}O{-}R_2}$$

wherein $R_1$ is selected from the group consisting of hydrogen, methyl, ethyl, propyl radicals and $R_2$ is in aliphatic radical having from 14 to 26 carbon atoms. Copolymers of the above described monomer with styrene monomers give optimum results when the degree of crystallinity is controlled so as to obtain the most desirable frosting capability.

One of the basic requirements to obtain frostable materials is to satisfy the ratio of resistivity (charge retention) to viscosity preferably at a minimum of $10^6$ to 1, where resistivity is exressed in ohm-cm. and viscosity is expressed in poises. This condition is easily met in utilizing polymers of the present invention because these polymers have characteristically sharp melting points so that the rate of change of viscosity at the melting point is much greater than the rate of change of resistivity (charge retention), so much so that it appears that the resistivity dissipates negligibly while the viscosity of the polymer changes in the order of $10^{10}$ thereby resulting in a ratio of resistivity to viscosity in excess of $10^6$ to 1. It will be appreciated, therefore, that the more crystallinity present in the polymer the sharper the melting point and the higher resulting ratio of resistivity to viscosity. However, it has been found that the higher the crystallinity present in the resulting polymer the more tendency there is for the resulting surface formed to be rougher, more opalescent and whitish which interferes with the frost process since exposure to an image results in the very same appearance. Therefore, it is desirable that an optimum degree of crystallinity be utilized which would maximize the frostable properties of the resulting polymers and not interfere with the frost imaging process. This optimum degree of crystallinity has been found to be such that the resulting polymers have a melting range of up to about 5° C. Though the optimum crystallinity for a given polymer composition has been found to vary from case to case generally a crystallinity of about 50% has been found to be suitable. The degree of crystallinity in the resulting polymer may be varied by copolymerizing a crystalline monomer with an amorphous monomer using well-known methods.

The crystalline substituents of the present invention may comprise stereo-specific resins such as isotactic and syndiotic, crystalline polymers. Many methods of preparing stereo-regular crystalline polymers are well known. Any suitable method may be used to prepare the crystalline polymers of the present invention. Typical methods of forming crystalline polymers are described by Leo Mandelkern in his book, "Crystallization of Polymers", McGraw-Hill Book Company, New York (1964) and by M. L. Miller, "The Structure of Polymers," Reinhold Publishing Company, New York (1966). Typical of the resins which may be crystallized according to these processes include polyesters, polyamides, polyethers, polyurethanes, polyolefins, isotactic acrylates and methacrylates, aromatics; side chain acrylates and methacrylates, side chain aromatics, vinyl ether side chains, side chain fumarates and maleates, side chain vinyl ketones, side chain vinyl esters, side chain vinyl amides, side chain vinyl urethanes and copolymers and mixtures thereof. Of the crystalline substituent having the general formula $$\mathrm{C{=}\overset{\displaystyle R_1}{\overset{|}{C}}{-}\overset{\displaystyle O}{\overset{\|}{C}}{-}O{-}R_2}$$

carbon chains of from about 14 to 26 for $R_2$ are preferred because they more readily fulfill the requirements of the present invention.

The resulting polymer or copolymer above described may be employed in accordance with the present invention by utilizing those techniques of forming a surface deformable layer exposing it and imaging thereon described in U.S. Pat. 3,196,011. Any suitable imaging method may be used in the process of the present invention. The following methods have been found to be suitable:

(I) In this method a photoconductive material is overcoated with a thermoplastic composition within the scope of the present invention. The resin surface of the resulting composite structure is uniformly charged, selectively exposed to an image, recharged, then heated to the deformation temperature. Subsequently, the thermoplastic deforms in accordance with the electrostatic charge pattern. The resulting frost pattern is fixed by cooling. When desired the image may be released by heating the thermoplastic composition to the surface deformable temperature allowing the original surface to be restored.

(II) A thermoplastic composition conforming to the requirements of the present invention is selectively charged in imagewise configuration and allowed to deform at the surface deformable temperature in accordance with the electrostatic charge pattern. The image may then be fixed or erased and reimaged as in I.

(III) A plate may be made from a thin layer of photoconductive material coated over a thermoplastic layer conforming to the requirements of the present invention. The resulting plate is uniformly charged and the resulting charge selectively dissipated by exposure to an image. The thermoplastic layer is then allowed to deform imagewise at the surface deformable temperature. Obviously, there is deformation of both the photoconductive and thermoplastic layers. The image may then be fixed as in I.

(IV) In another approach, a photoconductive material is dispersed or dissolved in the thermoplastic material of the present invention and the resulting mixture coated on a transparent conductive substrate. The surface of the plate is then uniformly charged and selectively exposed to an electromagnetic radiation source at the surface deformable temperature resulting in imagewise deformation. In the instance where the thermoplastic material with the photoconductive material incorporated therein is transparent, the imaged sheet produces a transparency suitable for viewing by means of a conventional project-display device. The image may then be fixed or erased and reimaged as in I.

Surface deformable crystalline thermoplastics used in the course of the present invention may be a self-supporting composition or a composition deposited over a substrate such as a conductive base and/or a composition overcoating a photoconductor. In addition, the photoconductive material may be incorporated as discussed above, within the thermoplastic material. The mixture of the thermoplastic material and the photoconductive material may itself be cast as a single self-supporting film or layer. When utilized, the support substrate for the recording member may be any suitable conductive material such as a metal plate, for example, brass, conductive glass or various conductive plastics. The thermoplastic crystalline materials used in the course of the present invention generally will have a resistivity of about $10^{10}$ ohm-cm. or greater at the surface deformable temperature. Generally, the bulk thermoplastic composition will have a viscosity of about $10^{11}$ poises or less at the development temperature with optimum results generally found to be obtained at about $10^6$ poises. When utilizing the thermoplastic crystalline materials of the present invention, film thicknesses of about 1 to 25 have been found suitable. The materials are charged from about 25 to 100 volts per micron. It is understood, however, that these parameters will depend to some extent on the particular properties of the specific material used as the frostable substrate.

Any suitable softening technique may be employed which allows the deformable layer to form an image. This includes heating and exposure to a suitable solvent vapor according to well-known techniques in the art. It is understood that where softening of the surface deformable layer is indicated, similar results may be obtained by either heating or exposure to a solvent vapor.

DESCRIPTION OF THE PREFERRED EMBODIMENTS

To further define the specifics of the present invention the following examples are intended to illustrate and not limit the particulars of the present invention. Parts and percentages are by weight unless otherwise indicated.

In each of the following examples, film thickness is measured with a Carl Zeiss light section microscope at 400 magnification, applying the equation:

$$S=\frac{S'}{2}\sqrt{(2n^2-1}$$

wherein S is the actual film thickness, S' is the distance between light bands or apparent thickness and $n$ is the refractive index of the coating. Voltage measurements are made with the transparent probe electrometer. The examples are intended to illustrate various preferred embodiments of the present invention.

EXAMPLE I

Excess methylacrylate is reacted with n-docosyl alcohol in the presence of catalytic amounts of p-t-butyl catechol and p-toluene sulfonic acid. Removal of the methanol/methylacrylate azeotrope, boiling point 62° C., drives the transesterification to completion. Any excess methylacrylate, boiling point 80° C., is removed under vacuum and the resulting monomer is then purified by removing the p-t-butyl catechol and p-toluene sulfonic acid by precipitation from a toluene solution into a 10 percent water-methanol solution with filtering and drying (or by passing the monomer at about 75° C. through an ion exchange column such as an Amberlyst A–27 column). The crystalline monomer thus produced is then melt polymerized with 30 mol percent) of styrene using azo-bis-isobutyronitrile catalyst to form a copolymer containing 30 percent styrene and 70 percent C–22 acrylate. (The polymer melted sharply at 65° C. had a viscosity of 900 centipoises at its melting temperature and a molecular weight equal to 70,000 and a resistivity of about $10^{17}$ ohm-cm. room temperature.) The copolymer is coated from toluene onto an aluminum sheet to a thickness of about 2 microns and then heated at 70° C. for 10 minutes to enable the particulate coating to flow out into a uniform film. The coated plate is charged in a Xerox Model D charger to about +300 volts, heated at 65° C. until frost developed, and finally cooled to room temperature to preserve the frost image.

EXAMPLE II

Styrene is melt polymerized with stearyl vinyl ketone in the presence of azo-bis-isobutyronitrile catalyst to form a copolymer containing 20 percent styrene and 80 percent stearyl vinyl ketone. The copolymer is coated from toluene onto an aluminum sheet to a thickness of about 2 microns and then heated at 70° C. for 10 minutes to enable the particulate coating to flow out into a uniform film. The coated plate is charged in a Xerox Model D charger to about +300 volts, heated until frost developed, and finally cooled to room temperature to preserve the frost image.

EXAMPLE III

Styrene is melt polymerized in the cationic mode with palmityl vinyl ether in the presence of tin chloride catalyst to form a copolymer containing 40% styrene and 60% palmityl vinyl ether. The copolymer is coated from toluene onto an aluminum sheet to a thickness of about 2 microns and then heated at 70° C. for 10 minutes to enable the particulate coating to flow out into a uniform film. The coated plate is charged in a Xerox Model D charger to about +300 volts, heated until frost developed, and finally cooled to room temperature to preserve the frost image.

EXAMPLE IV

Para-vinyl toluene is melt polymerized with stearyl vinyl ketone in the presence of azo-bis-isobutyronitrile catalyst to form a copolymer containing 30% para-vinyl toluene and 70% stearyl vinyl ketone. The copolymer is coated from toluene onto an aluminum sheet to a thickness of about 2 microns and then heated at 70° C. for 10 minutes to enable the particulate coating to flow out into a uniform film. The coated plate is charged in a Xerox Model D charger to about +300 volts, heated until frost developed, and finally cooled to room temperature to preserve the frost image.

EXAMPLE V

Para-methylstyrene is melt polymerized in the cationic mode with palmityl vinyl ether in the presence of tin chloride catalyst to form a copolymer containing 10% para-methylstyrene and 90% palmityl vinyl ether. The copolymer is coated from toluene onto an aluminum sheet to a thickness of about 2 microns and then heated at 70° C. for 10 minutes to enable the particulate coating to flow out into a uniform film. The coated plate is charged in a Xerox Model D charger to about +300 volts, heated until frost developed, and finally cooled to room temperature to preserve the frost image.

EXAMPLE VI

Para-chlorostyrene is melt polymerized in the cationic mode with palmityl vinyl ether in the presence of tin chloride catalyst to form a copolymer containing 30% para-chlorostyrene and 70% palmityl vinyl ether. The copolymer is coated from toluene onto an aluminum sheet to a thickness of about 2 microns and then heated at 70° C. for 10 minutes to enable the particulate coating to flow out into a uniform film. The coated plate is charged in a Xerox Model D charger to about +300 volts, heated until frost developed, and finally cooled to room temperature to preserve the frost image.

EXAMPLE VII

C–22 acrylate is melt polymerized in the presence of azo-bis-isobutyronitrile catalyst forming a homopolymer with a melting point of 78° C. The homopolymer is coated from toluene onto an aluminum sheet to a thickness of about 2 microns and then heated at 85° C. for 10 minutes to enable the particulate coating to flow out into a uniform film. The coated plate is charged in a Xerox Model D charger to about +300 volts, heated at 78° C. until frost developed, and finally cooled to room temperature to preserve the frost image.

Although the present examples were in specific terms of conditions and materials used, any of the above listed typical materials may be substituted when suitable in the above examples with similar results. In addition to the steps used to carry out the process of the present invention, other steps or modifications may be used, if desirable. For example relief images may be obtained by employing the appropriate process variations. In addition, other materials may be incorporated in the surface deformable thermoplastic which will enhance, synergize or otherwise desirably affect the properties of the systems for their present use. For example, the surface deformable crystalline thermoplastic may contain sensitizers which are dissolved or suspended in the thermoplastic, or other amorphous polymers which provide for the desired results.

Anyone skilled in the art will have other modifications occur to him based on the teaching of the present invention. These modifications are intended to be encompassed within the scope of this invention.

What is claimed is:

1. A process for forming a surface deformation image comprising providing a crystalline, sharp melting polymeric material said material having a melting range up to 5° C. and a crystallinity greater than 50%, selectively forming an electrostatic charge pattern on the surface of said material and exposing said charged material to an environment so as to produce said image.

2. The process as disclosed in claim 1 wherein said polymer is selected from at least one member of the group consisting of long side chain acrylates and methacrylates and copolymers made up of substituted styrenes such as alkyl, ether and halo derivatives and side chain acrylate and methacrylate monomers.

3. The process as disclosed in claim 1 wherein said polymer has a melting point lying in the range of from about 30° C. to about 140° C.

4. The process as disclosed in claim 1 wherein said polymer comprises a crystalline substituent having the following general formula:

$$C{=}C(R_1){-}C({=}O){-}O{-}R_2$$

wherein $R_1$ is selected from at least one member of the group consisting of hydrogen, methyl, ethyl, propyl radicals and $R_2$ is an aliphatic radical having from 14–26 carbon atoms.

5. The process disclosed in claim 1 wherein said crystalline polymer has a resistivity to viscosity ratio of greater than $10^6$:1 at the deformation temperature where resistivity is expressed in ohm-cm. and viscosity is expressed in poises.

6. A process for providing surface deformation images comprising uniformly charging the surface of a surface deformable crystalline polymer said polymer having a melting range of up to 5° C. and a crystallinity of greater than 50%, residing over a photoconductive layer selectively exposing said polymer surface to an electromagnetic radiation source and softening said photoconductive surface of said polymer to produce said image.

7. The process as disclosed in claim 6 wherein said surface deformable crystalline polymer is selected from at least one member of the group consisting of long side chain acrylates, and methacrylates and copolymers made up of substituted styrenes such as alkyl, ether, and halo derivatives and side chain acrylate and methacrylate monomers.

8. The process as disclosed in claim 6 wherein said surface deformable crystalline polymer comprises a thermoplastic crystalline substituent satisfying the following general formula:

$$C{=}C(R_1){-}C({=}O){-}O{-}R_2$$

wherein $R_1$ is selected from at least one member of the group consisting of hydrogen, methyl, ethyl and propyl and $R_2$ is an aliphatic radical having from about 14–26 carbon atoms.

9. The process as disclosed in claim 6 wherein said surface deformable crystalline polymer comprises a polymer having a melting point lying in the range of from about 30° C. to about 140° C.

10. The process as disclosed in claim 6 wherein said surface deformable crystalline polymer has a resistivity to viscosity ratio of about $10^6$:1 at the deformation temperature where resistivity is expressed in ohm-cm. and viscosity is expressed in poises.

11. A method of producing a frost image comprising providing a sharp melting crystalline polymer recording medium which is softenable under the influence of an electrostatic charge differential said polymer having a melting range of up to 5° C. and a crystallinity of greater than 50% and developing a difference in charge density in an imagewise configuration on the surface of said material at its surface deformable temperature.

12. The process as disclosed in claim 11 wherein said recording medium comprises a crystalline polymer superimposed on the surface of a support substrate.

13. A member comprising a sharp melting crystalline polymeric recording medium containing a surface deformation image on the surface thereof said polymer having a melting range of up to 5° C. and a crystallinity of greater than 50%.

14. A member as disclosed in claim 13 wherein said polymeric recording medium is superimposed on a support substrate.

15. A member as disclosed in claim 13 wherein said polymer is selected from at least one member of the group consisting of long side chain acrylates and methacrylates and copolymers of substituted styrene such as alkyl, ether, and halo derivatives and side chain acrylate and methacrylate monomers.

16. A member as disclosed in claim 13 wherein said polymer has a melting point lying in the range of from about 30° C. to about 140° C.

17. A member as disclosed in claim 13 wherein said polymer has a resistivity to viscosity ratio of at least about $10^6$:1 at the deformation temperature where resistivity is expressed in ohm-cm. and viscosity is expressed in poises.

18. A member comprising a substrate over which is superimposed deformable layer comprising a sharp melting crystalline polymer containing a surface deformation image thereon, said polymer having a melting range of up to 5° C. and a crystallinity of greater than 50%.

References Cited

UNITED STATES PATENTS

| | | | |
|---|---|---|---|
| 3,196,011 | 7/1965 | Gunther et al. | 96—1.1 |
| 3,310,401 | 3/1967 | Greig | 96—1.1 X |
| 3,413,146 | 11/1968 | Anderson et al. | 96—1.1 X |
| 3,436,216 | 4/1969 | Urbach | 96—1.1 |
| 3,441,947 | 4/1969 | Schmiedel et al. | 96—1 X |
| 3,443,937 | 5/1969 | Ewing | 96—1.1 |

OTHER REFERENCES

Mandel Kern, Crystallization of Polymers, McGraw-Hill Book Co. (1964), p. 105.

Miller, M. L., The Structure of Polymers, Reinhold Book Corporation (1966), pp. 524–527, 537–539.

CHARLES E. VAN HORN, Primary Examiner

U.S. Cl. X.R.

117—218; 355—9; 178—6.6 TP